US012555521B2

(12) United States Patent
Lee et al.

(10) Patent No.: US 12,555,521 B2
(45) Date of Patent: Feb. 17, 2026

(54) DISPLAY DEVICE AND PIXEL INCLUDED THEREIN

(71) Applicant: Samsung Display Co., Ltd., Yongin-Si (KR)

(72) Inventors: Kon-Haeng Lee, Yongin-si (KR); Soyoung Kim, Yongin-si (KR); Jong-Keun Kim, Yongin-si (KR); Jungkook Park, Yongin-si (KR); Seok-Hyun Jung, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/985,020

(22) Filed: Dec. 18, 2024

(65) Prior Publication Data

US 2025/0308437 A1 Oct. 2, 2025

(30) Foreign Application Priority Data

Apr. 1, 2024 (KR) ........................ 10-2024-0043983

(51) Int. Cl.
*G09G 3/3258* (2016.01)
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2300/0861* (2013.01); *G09G 2310/08* (2013.01); *G09G 2320/0247* (2013.01); *G09G 2330/021* (2013.01); *G09G 2340/0435* (2013.01)

(58) Field of Classification Search
CPC ............. G09G 3/32; G09G 2300/0819; G09G 2300/0842; G09G 2300/0861; G09G 2310/08; G09G 2320/0247; G09G 2330/021; G09G 2340/0435; G09G 3/3266; G09G 3/3233; G09G 3/3258
See application file for complete search history.

(56) References Cited

U.S. PATENT DOCUMENTS

| | | | | |
|---|---|---|---|---|
| 2010/0191492 A1 | 7/2010 | Kawashima | | |
| 2021/0375209 A1* | 12/2021 | Han | ..................... | G09G 3/3258 |
| 2022/0270542 A1* | 8/2022 | Park | ..................... | G09G 3/3233 |
| 2023/0154389 A1 | 5/2023 | Park et al. | | |
| 2024/0021165 A1* | 1/2024 | Kang | .................. | G09G 3/3266 |

FOREIGN PATENT DOCUMENTS

| | | |
|---|---|---|
| KR | 10-0981972 B1 | 9/2010 |
| KR | 10-2023-0071903 A | 5/2023 |

* cited by examiner

*Primary Examiner* — Abdul-Samad A Adediran
(74) *Attorney, Agent, or Firm* — Innovation Counsel LLP

(57) ABSTRACT

A display device includes a display panel including a pixel, a gate driver which provides a plurality of gate signals to the pixel, a data driver which provides a data voltage to the pixel in an address scan period and does not provide the data voltage to the pixel in a self-scan period, and a power management circuit which provides high gate voltages of the gate signals to the gate driver. A level of a high gate voltage which is one of the high gate voltages in the self-scan period may be different from a level of the high gate voltage in the address scan period.

20 Claims, 11 Drawing Sheets

DISPLAY DEVICE AND PIXEL INCLUDED THEREIN

CROSS-REFERENCE TO RELATED APPLICATION(S)

This application claims priority under 35 USC § 119 to Korean Patent Application No. 10-2024-0043983 filed on Apr. 1, 2024, in the Korean Intellectual Property Office (KIPO), the entire disclosure of which is incorporated by reference herein.

BACKGROUND

1. Field

Embodiments of the present disclosure relate to a display device. More particularly, the present disclosure relates to a display device to which a variable refresh rate method is applied and to a pixel included in the display device.

2. Description of the Related Art

A display device may include a plurality of pixels, and may display an image based on light emitted from the pixels. The display device may display an image using a variable refresh rate driving method, which allows the driving frequency to be adjusted.

Each of the pixels may include at least one low-temperature polycrystalline silicon transistor. When the low-temperature polycrystalline silicon transistor is turned off, a leakage current may occur in the low-temperature polycrystalline silicon transistor. Specifically, the leakage current of the low-temperature polycrystalline silicon transistor may increase as a temperature of the display device increases or the driving frequency of the display device decreases. When the leakage current of the low-temperature polycrystalline silicon transistor increases, display defects such as vertical crosstalk, flicker, or the like may occur in an image displayed by the display device.

SUMMARY

Embodiments of the present disclosure provide a display device having an improved display quality.

Embodiments provide a pixel that reduces a leakage current.

A display device according to an embodiment of the present disclosure may include a display panel including a pixel, a gate driver which provides a plurality of gate signals to the pixel, a data driver which provides a data voltage to the pixel in an address scan period and does not provide the data voltage to the pixel in a self-scan period, and a power management circuit which provides high gate voltages of the gate signals to the gate driver. A level of a high gate voltage which is one of the high gate voltages in the self-scan period may be different from a level of the high gate voltage in the address scan period.

In an embodiment, the level of the high gate voltage in the self-scan period may be higher than the level of the high gate voltage in the address scan period.

In an embodiment, the pixel may include a light-emitting element, a first transistor which controls a driving current which flows through the light-emitting element, a second transistor which provides the data voltage to a gate of the first transistor in response to a first gate signal, and a storage capacitor which stores a voltage of the gate of the first transistor. A level of a first high gate voltage which is a gate-off voltage of the first gate signal in the self-scan period may be different from a level of the first high gate voltage in the address scan period.

In an embodiment, the level of the first high gate voltage in the self-scan period may be higher than the level of the first high gate voltage in the address scan period.

In an embodiment, the pixel may further include a third transistor which compensates for a threshold voltage of the first transistor in response to a second gate signal. A level of a second high gate voltage which is a gate-off voltage of the second gate signal in the self-scan period may be different from a level of the second high gate voltage in the address scan period.

In an embodiment, the level of the second high gate voltage in the self-scan period may be higher than the level of the second high gate voltage in the address scan period.

In an embodiment, the pixel may further include a fourth transistor which provides a first initialization voltage to the gate of the first transistor in response to a third gate signal. A level of a third high gate voltage which is a gate-off voltage of the third gate signal in the self-scan period may be different from a level of the third high gate voltage in the address scan period.

In an embodiment, the level of the third high gate voltage in the self-scan period may be higher than the level of the third high gate voltage in the address scan period.

In an embodiment, each of the third transistor and the fourth transistor may be a low-temperature polycrystalline silicon transistor.

In an embodiment, the pixel may further include a fifth transistor which blocks a connection between a first electrode of the first transistor and a first power voltage in response to an emission signal, a sixth transistor which blocks a connection between a second electrode of the first transistor and a second power voltage in response to the emission signal, and a seventh transistor which provides a second initialization voltage to a first electrode of the light-emitting element in response to a fourth gate signal. A level of a fourth high gate voltage which is a gate-off voltage of the fourth gate signal in the self-scan period may be equal to a level of the fourth high gate voltage in the address scan period.

In an embodiment, the pixel may further include an eighth transistor which provides a bias voltage to the first electrode of the first transistor in response to the fourth gate signal.

In an embodiment, a frame period may include the address scan period and a plurality of self-scan periods including the self-scan period, and a length of the self-scan period may be equal to a length of the address scan period.

In an embodiment, the number of self-scan periods included in the frame period may increase as a driving frequency of the display panel decreases.

A pixel according to an embodiment of the present disclosure may include a light-emitting element, a first transistor which controls a driving current which flows through the light-emitting element, a second transistor which provides a data voltage to a gate of the first transistor in response to a first gate signal, and a storage capacitor which stores a voltage of the gate of the first transistor. A level of a first high gate voltage which is a gate-off voltage of the first gate signal in a self-scan period may be different from a level of the first high gate voltage in an address scan period.

In an embodiment, the level of the first high gate voltage in the self-scan period may be higher than the level of the first high gate voltage in the address scan period.

In an embodiment, the pixel may further include a third transistor which compensates for a threshold voltage of the first transistor in response to a second gate signal. A level of a second high gate voltage which is a gate-off voltage of the second gate signal in the self-scan period may be different from a level of the second high gate voltage in the address scan period.

In an embodiment, the level of the second high gate voltage in the self-scan period may be higher than the level of the second high gate voltage in the address scan period.

In an embodiment, the pixel may further include a fourth transistor which provides a first initialization voltage to the gate of the first transistor in response to a third gate signal. A level of a third high gate voltage which is a gate-off voltage of the third gate signal in the self-scan period may be different from a level of the third high gate voltage in the address scan period.

In an embodiment, the level of the third high gate voltage in the self-scan period may be higher than the level of the third high gate voltage in the address scan period.

In an embodiment, each of the third transistor and the fourth transistor may be a low-temperature polycrystalline silicon transistor.

In the pixel according to the embodiments, as the level of the high gate voltage, which is the gate-off voltage of the gate signal, in the self-scan period may be different from the level of the high gate voltage in the address scan period, the leakage current of the transistor that is turned off in response to the gate signal may decrease.

The display device according to the embodiments may include the pixel in which the leakage current of the transistor is reduced, so that the display defect such as vertical crosstalk, flicker, or the like may decrease, and the display quality of the display device may be improved.

BRIEF DESCRIPTION OF THE DRAWINGS

The above and other features of embodiments of the present disclosure will become more apparent with reference to the descriptions below and the accompanying drawings.

DETAILED DESCRIPTION OF THE EMBODIMENTS

Figure 1:
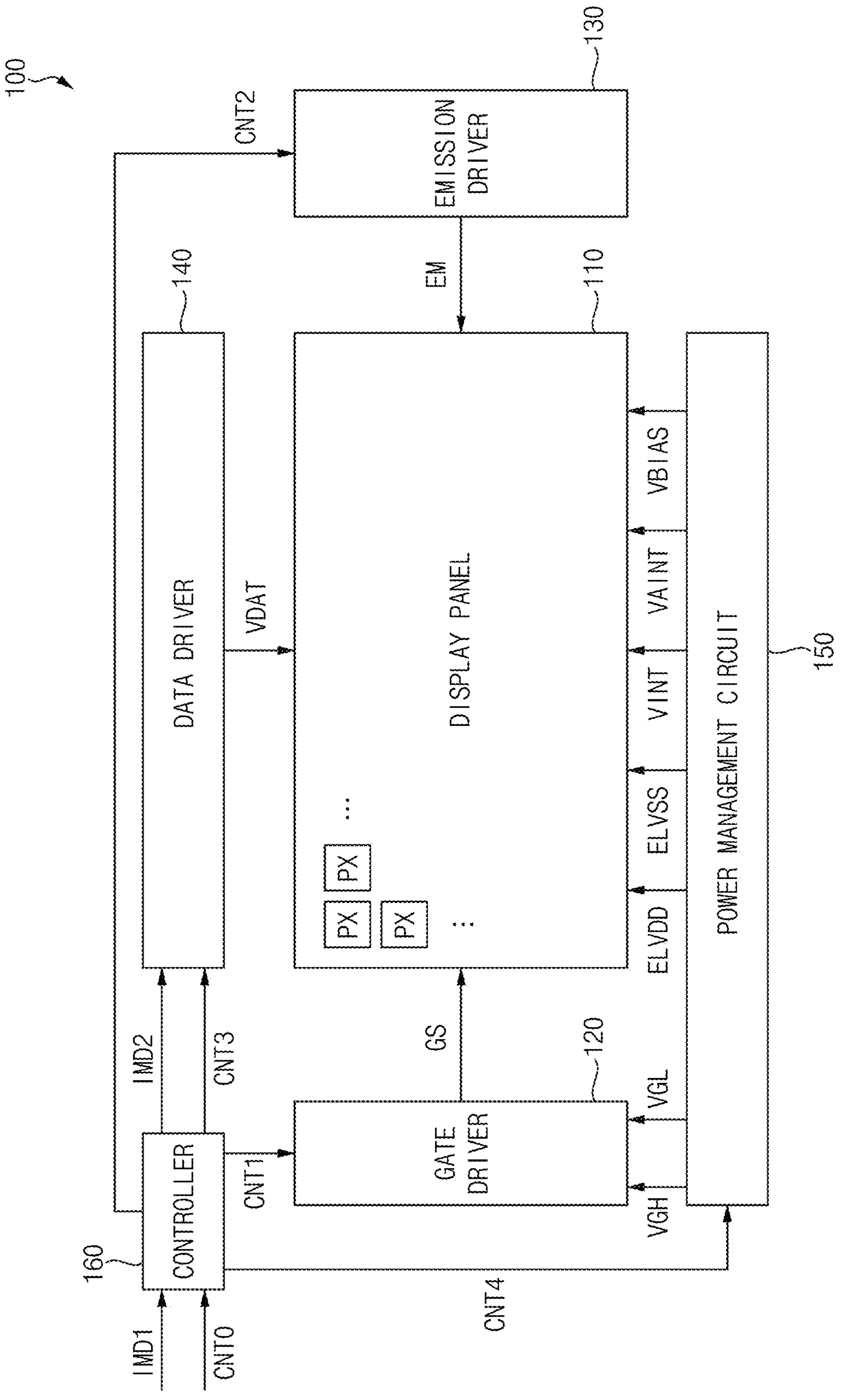
FIG. 1 is a block diagram showing a display device according to an embodiment.

Hereinafter, a display device and a pixel according to embodiments of the present disclosure will be described in more detail with reference to the accompanying drawings. The same or similar reference numerals will be used for the same elements in the accompanying drawings.

Figure 2:
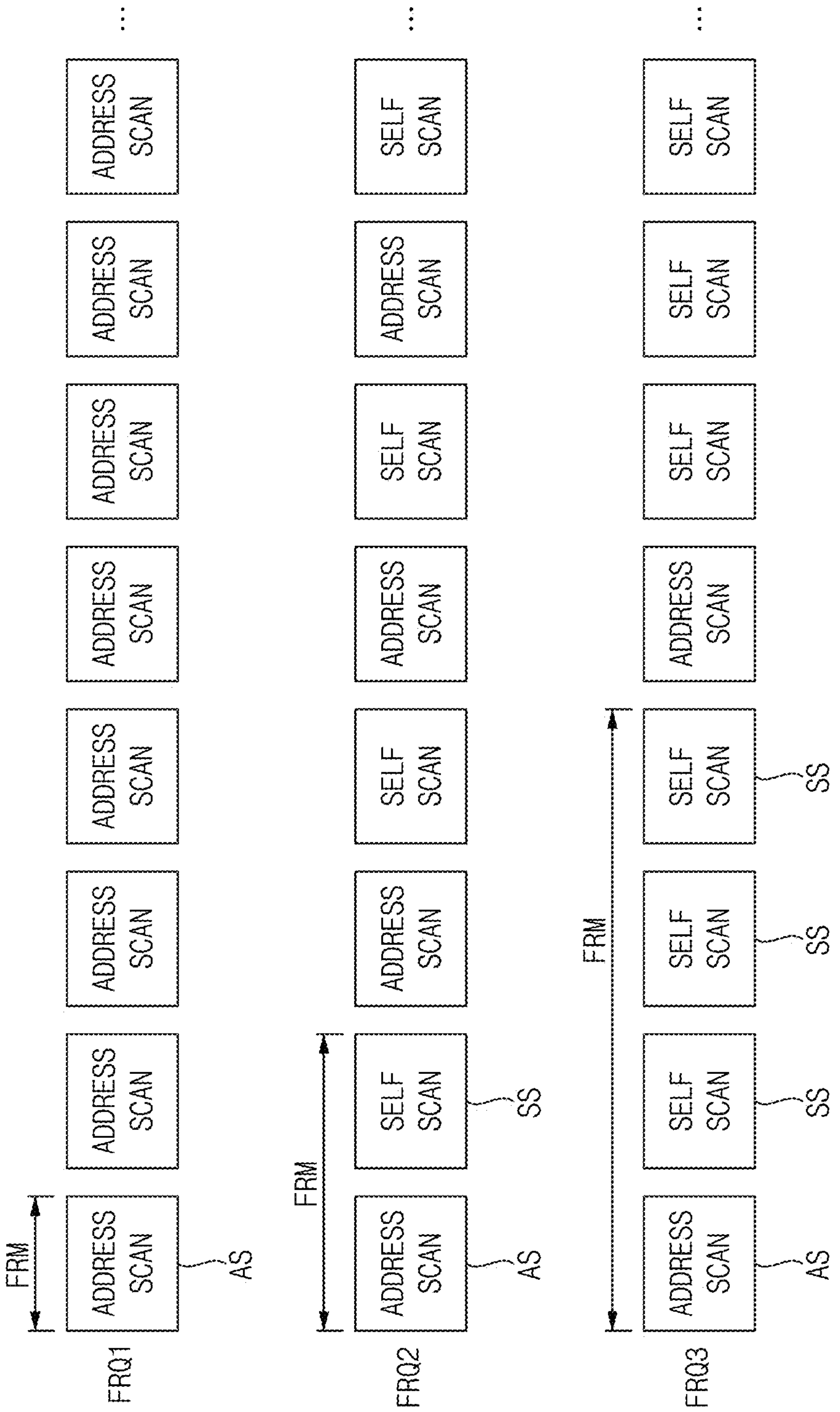
FIG. 2 is a diagram showing a variable refresh rate operation of a display panel of FIG. 1.

FIG. 1 is a block diagram showing a display device 100 according to an embodiment. FIG. 2 is a diagram showing a variable refresh rate operation of a display panel 110 of FIG. 1.

Referring to FIGS. 1 and 2, a display device 100 may include a display panel 110, a gate driver 120, an emission driver 130, a data driver 140, a power management circuit 150, and a controller 160.

The display panel 110 may include a plurality of pixels PX. The display panel 110 may display an image based on light emitted by each of the pixels PX.

The display panel 110 may display an image using a variable refresh rate driving method which allows a driving frequency to be adjusted. The driving frequency may represent a number of times per second that the image is displayed from the display panel 110 (in other words, the number of frame periods FRM).

Each of the frame periods FRM may include an address scan period AS and a self-scan period SS. In the address scan period AS, a data voltage VDAT may be written to the pixel PX, and the pixel PX may emit light with a luminance corresponding to the written data voltage VDAT. In the self-scan period SS, the data voltage VDAT may not be written to the pixel PX, and the pixel PX may emit light with the luminance corresponding to the data voltage VDAT which was written to the pixel PX in the address scan period AS.

In an embodiment, a length of the self-scan period SS may be substantially equal to a length of the address scan period AS. However, the number of self-scan periods SS included in the frame period FRM may be determined according to the driving frequency. In an embodiment, as the driving frequency decreases, the number of self-scan periods SS included in the frame period FRM may increase.

When the display panel 110 is driven at a first frequency FRQ1 (e.g., 120 Hz), the frame period FRM may include only one address scan period AS. When the display panel 110 is driven at a second frequency FRQ2 (e.g., 60 Hz) lower than the first frequency FRQ1, the frame period FRM may include one address scan period AS and one self-scan period SS. When the display panel 110 is driven at a third frequency FRQ3 (e.g., 30 Hz) lower than the second frequency FRQ2, the frame period FRM may include one address scan period AS and three consecutive self-scan periods SS.

The gate driver 120 may provide a plurality of gate signals GS to each of the pixels PX. The gate driver 120 may generate the gate signals GS based on a gate control signal CNT1, high gate voltages VGH, and low gate voltages VGL. The gate control signal CNT1 may include a gate start signal, a gate clock signal, etc. Each of the high gate voltages VGH may be a gate-off voltage for a P-type transistor or a gate-on voltage for an N-type transistor. Each of the low gate voltages VGL may be a gate-on voltage for the P-type transistor or a gate-off voltage for the N-type transistor.

The emission driver 130 may provide an emission signal EM to each of the pixels PX. The emission driver 130 may generate the emission signal EM based on an emission control signal CNT2. The emission control signal CNT2 may include an emission start signal, an emission clock signal, etc.

The data driver 140 may provide the data voltage VDAT to each of the pixels PX. The data driver 140 may provide the data voltage VDAT to each of the pixels PX in the address scan period AS, and may not provide the data voltage VDAT to each of the pixels PX in the self-scan period SS. The data driver 140 may generate the data voltages VDAT based on second image data IMD2 and a data control signal CNT3. The second image data IMD2 may include grayscale values corresponding to the pixels PX. The data control signal CNT3 may include a data clock signal, a horizontal start signal, a load signal, etc.

The power management circuit 150 may provide a first power voltage ELVDD, a second power voltage ELVSS, a first initialization voltage VINT, a second initialization voltage VAINT, and a bias voltage VBIAS to the pixels PX. A level of the first power voltage ELVDD may be higher than a level of the second power voltage ELVSS. The power management circuit 150 may provide the high gate voltages VGH and the low gate voltages VGL for the gate signals GS to the gate driver 120. The power management circuit 150 may generate the first power voltage ELVDD, the second power voltage ELVSS, the first initialization voltage VINT, the second initialization voltage VAINT, the bias voltage VBIAS, the high gate voltages VGH, and the low gate voltages VGL based on a power control signal CNT4.

The controller 160 may provide the gate control signal CNT1 to the gate driver 120, may provide the emission control signal CNT2 to the emission driver 130, may provide the second image data IMD2 and the data control signal CNT3 to the data driver 140, and may provide the power control signal CNT4 to the power management circuit 150. The controller 160 may generate the gate control signal CNT1, the emission control signal CNT2, the data control signal CNT3, and the power control signal CNT4 based on a controller control signal CNT0, and may convert first image data IMD1 into the second image data IMD2.

The pixel PX may include at least one low-temperature polycrystalline silicon transistor, which may be the P-type transistor. When the low-temperature polycrystalline silicon transistor is turned off, a leakage current may occur in the low-temperature polycrystalline silicon transistor. Specifically, the leakage current of the low-temperature polycrystalline silicon transistor may increase as a temperature of the display panel 110 increases or the driving frequency of the display panel 110 decreases. When the temperature of the display panel 110 is high or the driving frequency of the display panel 110 is low, a threshold voltage of the low-temperature polycrystalline silicon transistor may shift positively, and thus, the leakage current of the low-temperature polycrystalline silicon transistor may increase. When the leakage current of the low-temperature polycrystalline silicon transistor increases, display defects such as vertical crosstalk, flicker, or the like may occur in the image displayed by the display panel 110.

In an embodiment, a level of at least one high gate voltage VGH among the high gate voltages VGH in the self-scan period SS may be different from a level of the high gate voltage VGH in the address scan period AS. For example, the level of the high gate voltage VGH in the self-scan period SS may be higher than the level of the high gate voltage VGH in the address scan period AS. As the level of the high gate voltage VGH increases in the self-scan period SS, a level of the gate-off voltage of the low-temperature polycrystalline silicon transistor may increase in the self-scan period SS. Thus, the leakage current of the low-temperature polycrystalline silicon transistor may decrease in the self-scan period SS. Accordingly, even if the driving frequency of the display panel 110 decreases (even if the number of self-scan periods SS included in the frame period FRM increases), the leakage current of the low-temperature polycrystalline silicon transistor may not increase, and the display quality of the image displayed by the display panel 110 may be improved.

Figure 3:
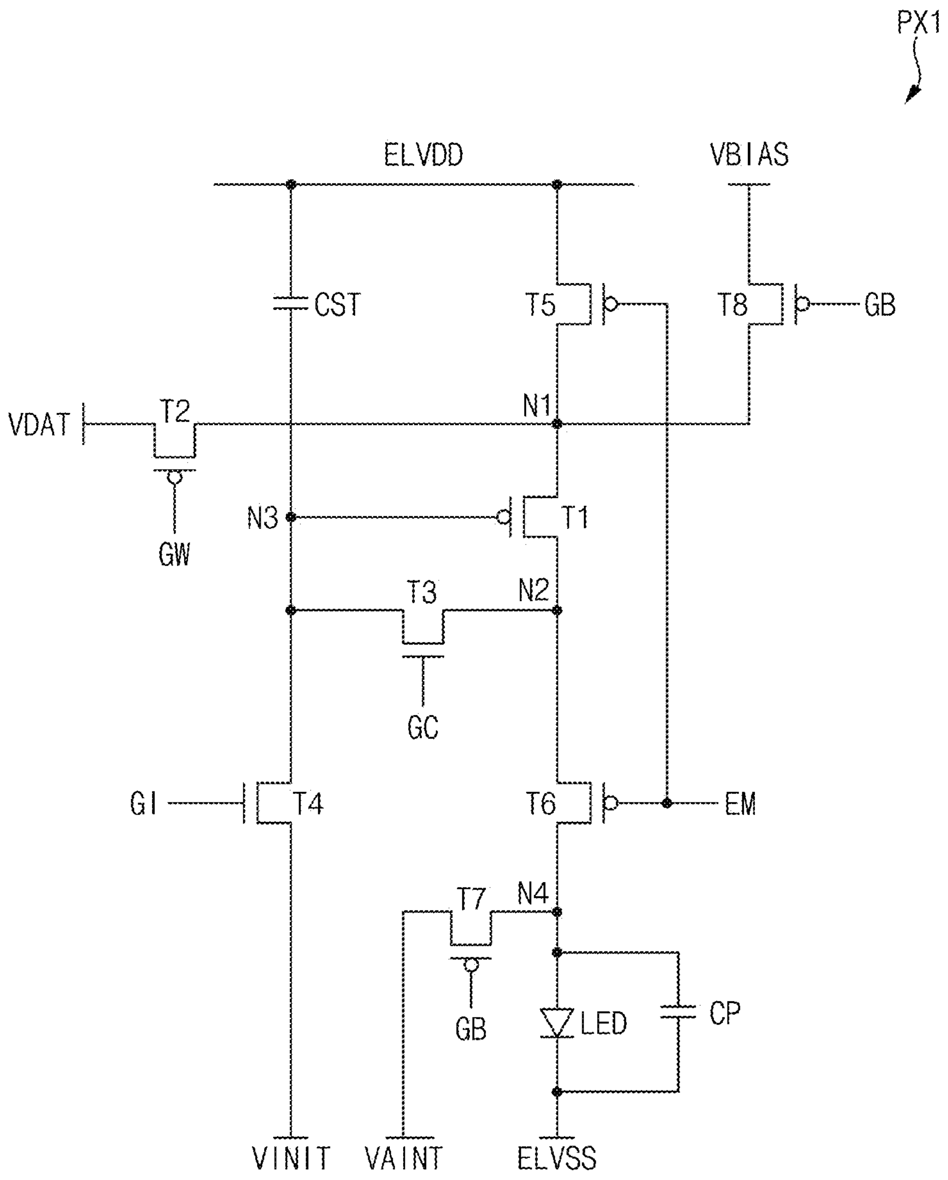
FIG. 3 is a circuit diagram showing an example of a pixel of FIG. 1.
Figure 4:
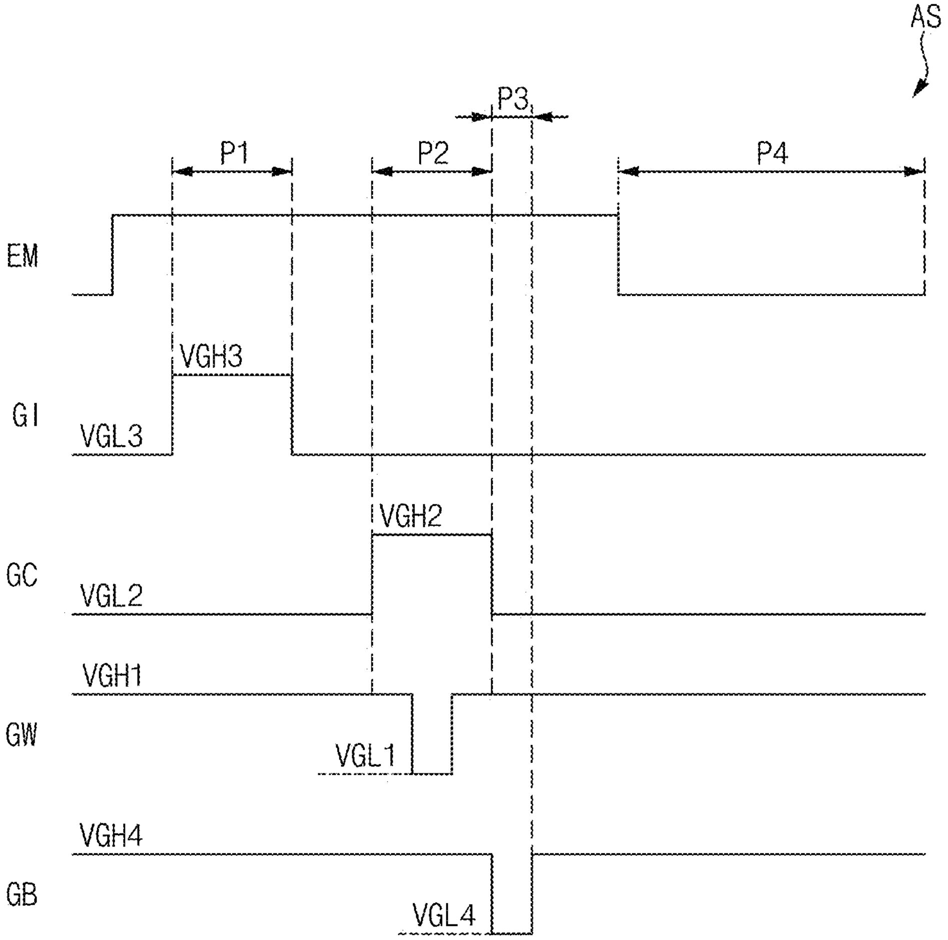
FIG. 4 is a timing diagram showing an emission signal and gate signals provided to the pixel of FIG. 3 in an address scan period.
Figure 5:
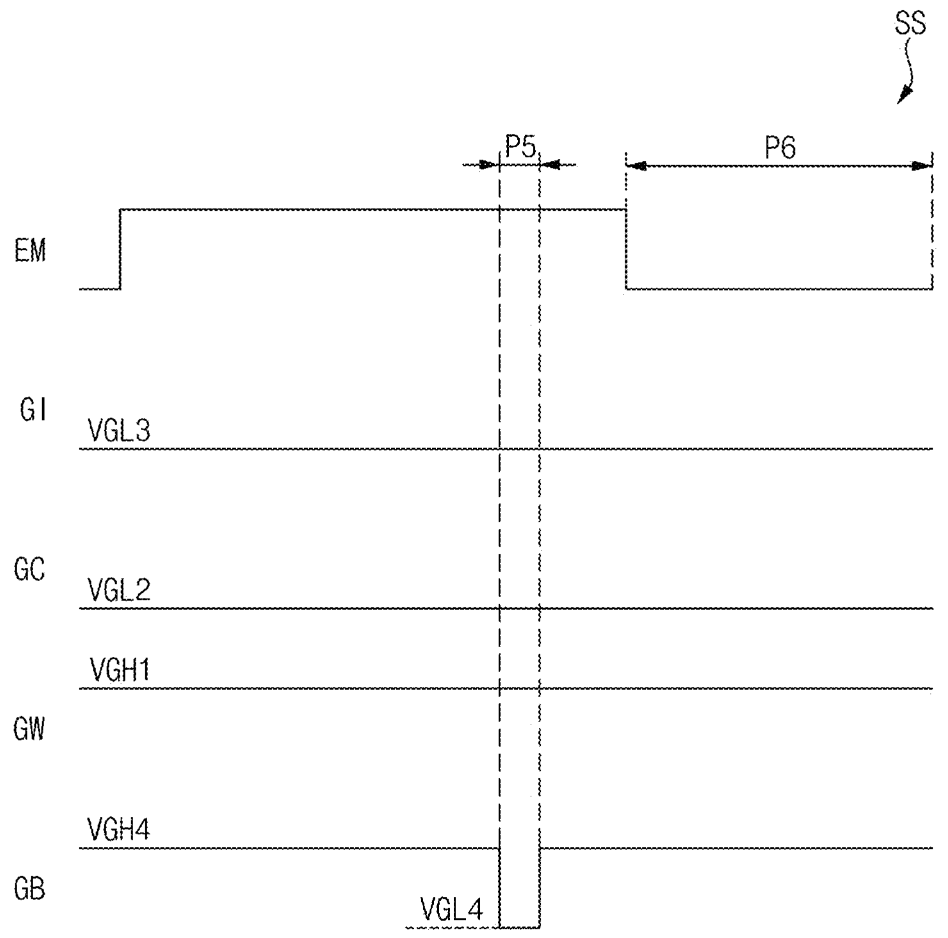
FIG. 5 is a timing diagram showing the emission signal and the gate signals provided to the pixel of FIG. 3 in a self-scan period.
Figure 6:
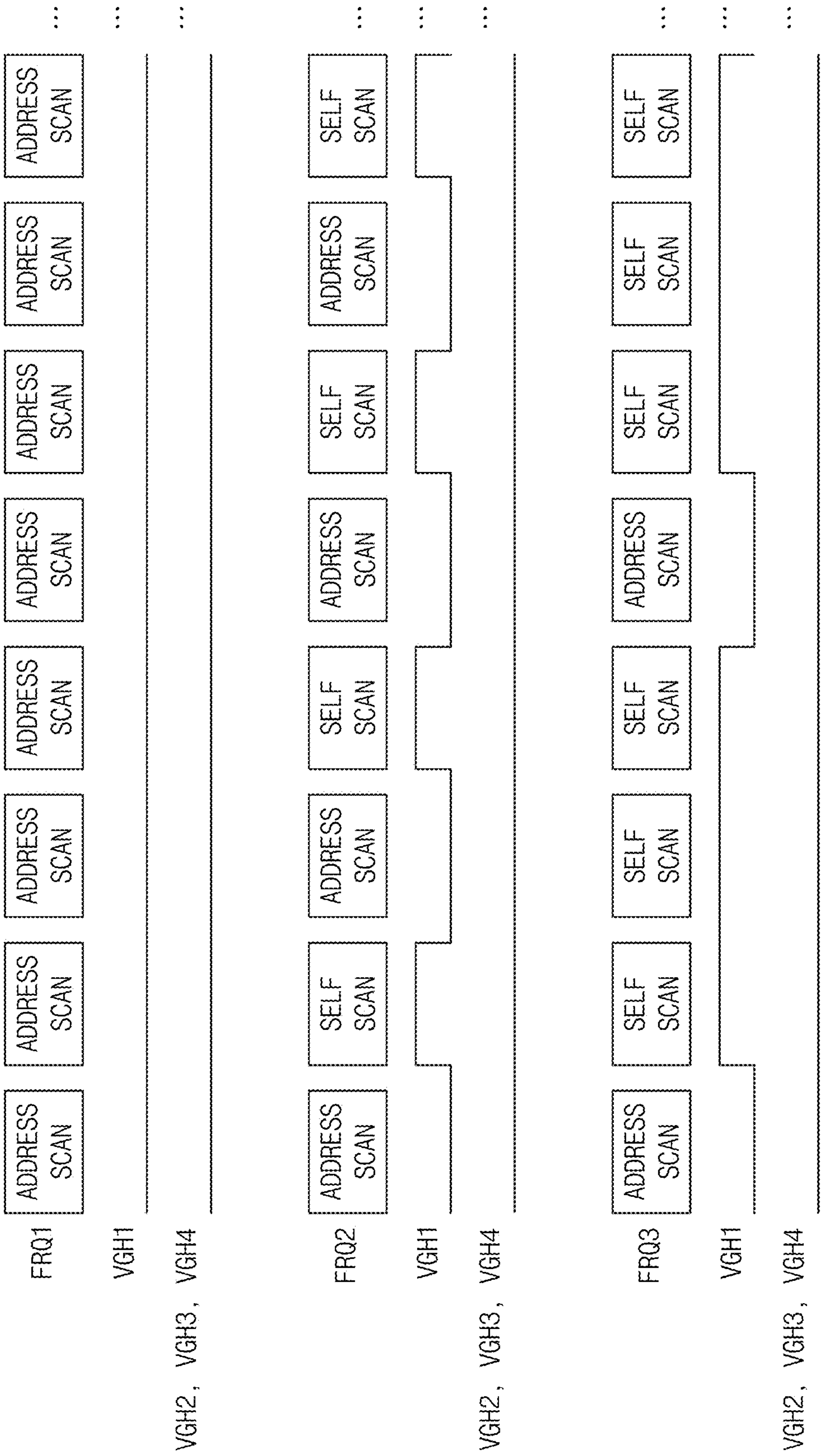
FIG. 6 is a timing diagram showing high gate voltages of the gate signals provided to the pixel of FIG. 3 for each driving frequency.

FIG. 3 is a circuit diagram showing an example of the pixel PX of FIG. 1. FIG. 4 is a timing diagram showing the emission signal EM and gate signals GI, GC, GW, and GB provided to the pixel PX1 of FIG. 3 in the address scan period AS. FIG. 5 is a timing diagram showing the emission signal EM and the gate signals GI, GC, GW, and GB provided to the pixel PX1 of FIG. 3 in the self-scan period SS. FIG. 6 is a timing diagram showing high gate voltages VGH1, VGH2, VGH3, and VGH4 of the gate signals GS provided to the pixel PX1 of FIG. 3 for each driving frequency.

Referring to FIGS. 1 to 6, the pixel PX1 may include a light-emitting element LED, a first transistor T1, a second transistor T2, a third transistor T3, a fourth transistor T4, a fifth transistor T5, a sixth transistor T6, a seventh transistor T7, an eighth transistor T8, and a storage capacitor CST.

The gate signals GS may include a first gate signal (or a write gate signal) GW, a second gate signal (or a compensation gate signal) GC, a third gate signal (or an initialization gate signal) GI, and a fourth gate signal (or a bypass gate signal) GB.

The high gate voltages VGH may include a first high gate voltage VGH1, a second high gate voltage VGH2, a third high gate voltage VGH3, and a fourth high gate voltage VGH4. In an embodiment, the first high gate voltage VGH1 may be a gate-off voltage of the first gate signal GW, the second high gate voltage VGH2 may be a gate-on voltage of the second gate signal GC, the third high gate voltage VGH3 may be a gate-on voltage of the third gate signal GI, and the fourth high gate voltage VGH4 may be a gate-off voltage of the fourth gate signal GB.

The low gate voltages VGL may include a first low gate voltage VGL1, a second low gate voltage VGL2, a third low gate voltage VGL3, and a fourth low gate voltage VGL4. In an embodiment, the first low gate voltage VGL1 may be a gate-on voltage of the first gate signal GW, the second low gate voltage VGL2 may be a gate-off voltage of the second gate signal GC, the third low gate voltage VGL3 may be a gate-off voltage of the third gate signal GI, and the fourth low gate voltage VGL4 may be a gate-on voltage of the fourth gate signal GB.

The light-emitting element LED may emit light with a luminance corresponding to a driving current. The light-emitting element LED may include a first electrode (e.g., an anode) connected to a fourth node N4 and a second electrode (e.g., a cathode) receiving the second power voltage ELVSS.

The first transistor T1 may control the driving current flowing through the light-emitting element LED. The first transistor T1 may include a gate connected to a third node N3, a first electrode connected to a first node N1, and a second electrode connected to a second node N2.

The second transistor T2 may provide the data voltage VDAT to the gate of the first transistor T1 in response to the first gate signal GW. The second transistor T2 may include a gate receiving the first gate signal GW, a first electrode receiving the data voltage VDAT, and a second electrode connected to the first node N1.

The third transistor T3 may compensate for a threshold voltage of the first transistor T1 in response to the second gate signal GC. The third transistor T3 may include a gate receiving the second gate signal GC, a first electrode connected to the second node N2, and a second electrode connected to the third node N3.

The fourth transistor T4 may provide the first initialization voltage VINT to the gate of the first transistor T1 in response to the third gate signal GI. The fourth transistor T4 may include a gate receiving the third gate signal GI, a first electrode receiving the first initialization voltage VINT, and a second electrode connected to the third node N3.

The fifth transistor T5 may block a connection between the first electrode of the first transistor T1 and the first power voltage ELVDD in response to the emission signal EM. The fifth transistor T5 may include a gate receiving the emission signal EM, a first electrode receiving the first power voltage ELVDD, and a second electrode connected to the first node N1.

The sixth transistor T6 may block a connection between the second electrode of the first transistor T1 and the second power voltage ELVSS in response to the emission signal EM. The sixth transistor T6 may include a gate receiving the emission signal EM, a first electrode connected to the second node N2, and a second electrode connected to the fourth node N4.

The seventh transistor T7 may provide the second initialization voltage VAINT to the first electrode of the light-emitting element LED in response to the fourth gate signal GB. The seventh transistor T7 may include a gate receiving the fourth gate signal GB, a first electrode receiving the second initialization voltage VAINT, and a second electrode connected to the fourth node N4.

The eighth transistor T8 may provide the bias voltage VBIAS to the first electrode of the first transistor T1 in response to the fourth gate signal GB. The eighth transistor T8 may include a gate receiving the fourth gate signal GB, a first electrode receiving the bias voltage VBIAS, and a second electrode connected to the first node N1.

In an embodiment, each of the first transistor T1, the second transistor T2, the fifth transistor T5, the sixth transistor T6, the seventh transistor T7, and the eighth transistor T8 may be the P-type transistor (e.g., a PMOS transistor), and each of the third transistor T3 and the fourth transistor T4 may be the N-type transistor (e.g., an NMOS transistor). In an embodiment, each of the first transistor T1, the second transistor T2, the fifth transistor T5, the sixth transistor T6, the seventh transistor T7, and the eighth transistor T8 may be the low-temperature polycrystalline silicon (LTPS) transistor, and each of the third transistor T3 and the fourth transistor T4 may be an oxide semiconductor transistor.

The storage capacitor CST may store a voltage of the gate of the first transistor T1. The storage capacitor CST may include a first electrode connected to the third node N3 and a second electrode receiving the first power voltage ELVDD.

In a first period P1 of the address scan period AS, the fourth transistor T4 may be turned on in response to the third high gate voltage VGH3 of the third gate signal GI, and the first initialization voltage VINT may be applied to the gate of the first transistor T1. Accordingly, a channel of the first transistor T1 may be formed before the data voltage VDAT is applied to the gate of the first transistor T1.

In a second period P2 of the address scan period AS, the third transistor T3 may be turned on in response to the second high gate voltage VGH2 of the second gate signal GC, and the first transistor T1 may be diode-connected. Further, the second transistor T2 may be turned on in response to the first low gate voltage VGL1 of the first gate signal GW, and the data voltage VDAT may be transmitted to the first electrode of the first transistor T1. Accordingly, the data voltage VDAT, which is compensated for the threshold voltage of the first transistor T1, may be applied to the gate of the first transistor T1, and the storage capacitor CST may store the data voltage VDAT compensated for the threshold voltage of the first transistor T1.

In a third period P3 of the address scan period AS, the seventh transistor T7 may be turned on in response to the fourth low gate voltage VGL4 of the fourth gate signal GB, and the second initialization voltage VAINT may be applied to the first electrode of the light-emitting element LED. Accordingly, charges stored in a parasitic capacitor CP of the light-emitting element LED may be discharged through the seventh transistor T7. Further, the eighth transistor T8 may be turned on in response to the fourth low gate voltage VGL4 of the fourth gate signal GB, and the bias voltage VBIAS may be applied to the first electrode of the first transistor T1. Accordingly, the first transistor T1 may be on-biased, and a hysteresis of the first transistor T1 may be controlled.

In a fourth period P4 of the address scan period AS, the fifth and sixth transistors T5 and T6 may be turned on in response to a gate-on voltage of the emission signal EM, and the driving current corresponding to the data voltage VDAT may flow through the light-emitting element LED. Accordingly, the light-emitting element LED may emit light with a luminance corresponding to the driving current.

In a fifth period P5 of the self-scan period SS, the seventh transistor T7 may be turned on in response to the fourth low gate voltage VGL4 of the fourth gate signal GB, and the second initialization voltage VAINT may be applied to the first electrode of the light-emitting element LED. Accordingly, charges stored in the parasitic capacitor CP of the light-emitting element LED may be discharged through the seventh transistor T7. Further, the eighth transistor T8 may be turned on in response to the fourth low gate voltage VGL4 of the fourth gate signal GB, and the bias voltage VBIAS may be applied to the first electrode of the first transistor T1. Accordingly, the first transistor T1 may be on-biased, and the hysteresis of the first transistor T1 may be controlled.

In a sixth period P6 of the self-scan period SS, the fifth and sixth transistors T5 and T6 may be turned on in response to the gate-on voltage of the emission signal EM, and a driving current corresponding to the data voltage VDAT applied in the address scan period AS may flow through the light-emitting element LED. Accordingly, the light-emitting element LED may emit light with a luminance corresponding to the driving current.

When the second transistor T2, which is the low-temperature polycrystalline silicon transistor, is turned off, a leakage current may occur in the second transistor T2. Specifically, the leakage current of the second transistor T2 may increase as the temperature of the display panel 110 goes higher or the driving frequency of the display panel 110 becomes lower. When the temperature of the display panel 110 is high or the driving frequency of the display panel 110 is low, a threshold voltage of the second transistor T2 may shift positively, and accordingly, the leakage current of the second transistor T2 may increase. When the leakage current of the second transistor T2 increases, display defects such as vertical crosstalk or the like may occur in the image displayed by the display panel 110.

In an embodiment, a level of the first high gate voltage VGH1 in the self-scan period SS may be different from a level of the first high gate voltage VGH1 in the address scan period AS. For example, the level of the first high gate voltage VGH1 in the self-scan period SS may be higher than the level of the first high gate voltage VGH1 in the address scan period AS. As the level of the first high gate voltage VGH1 increases in the self-scan period SS, the level of the gate-off voltage of the second transistor T2 may increase in the self-scan period SS. Thus, the leakage current of the second transistor T2 may decrease in the self-scan period SS. Accordingly, even if the driving frequency of the display panel 110 decreases (even if the number of self-scan periods SS included in the frame period FRM increases), the leakage current of the second transistor T2 may not increase, and the display quality of the image displayed by the display panel 110 may be improved.

In an embodiment, a level of the second high gate voltage VGH2 in the self-scan period SS may be equal to a level of the second high gate voltage VGH2 in the address scan period AS, a level of the third high gate voltage VGH3 in the self-scan period SS may be equal to a level of the third high gate voltage VGH3 in the address scan period AS, and a level of the fourth high gate voltage VGH4 in the self-scan period SS may be equal to a level of the fourth high gate voltage VGH4 in the address scan period AS.

Figure 7:
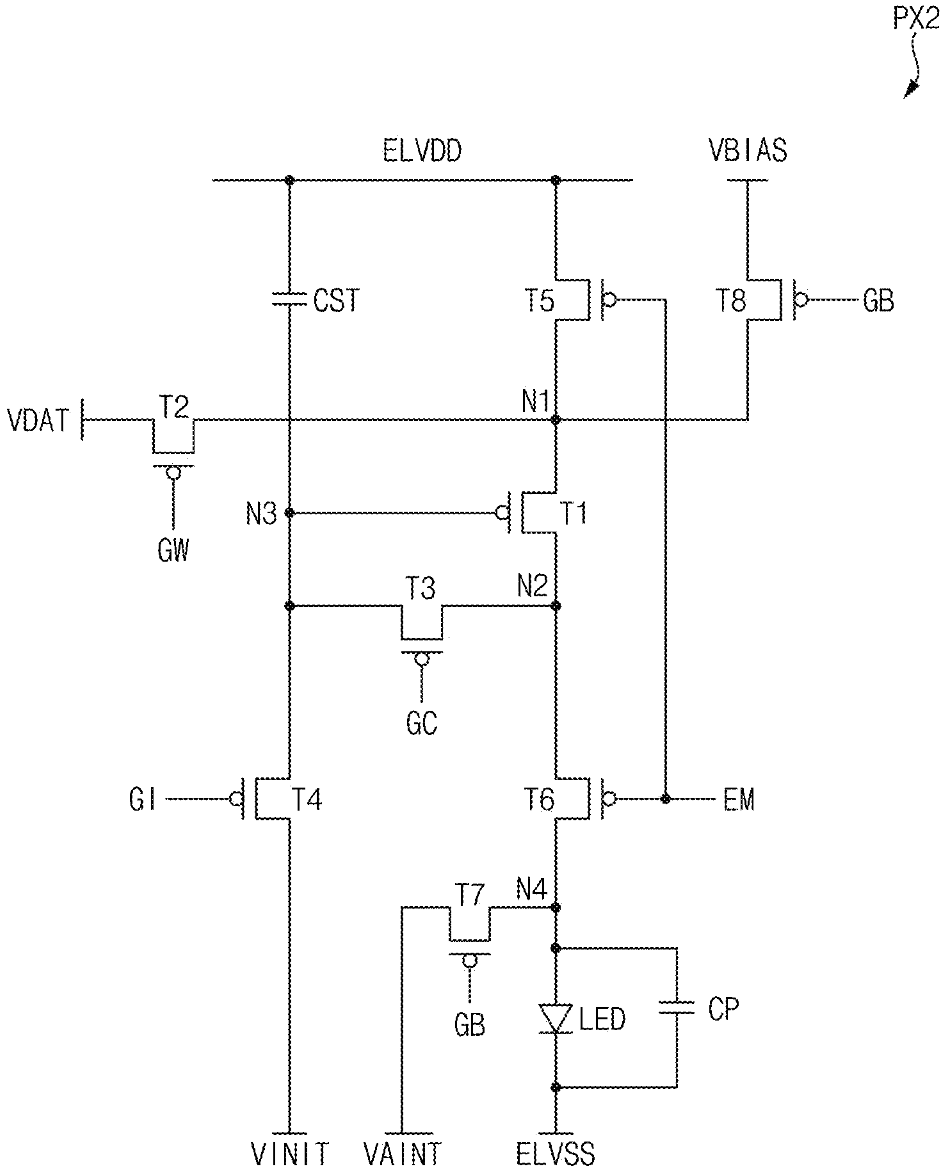
FIG. 7 is a circuit diagram showing an example of the pixel in FIG. 1.
Figure 8:
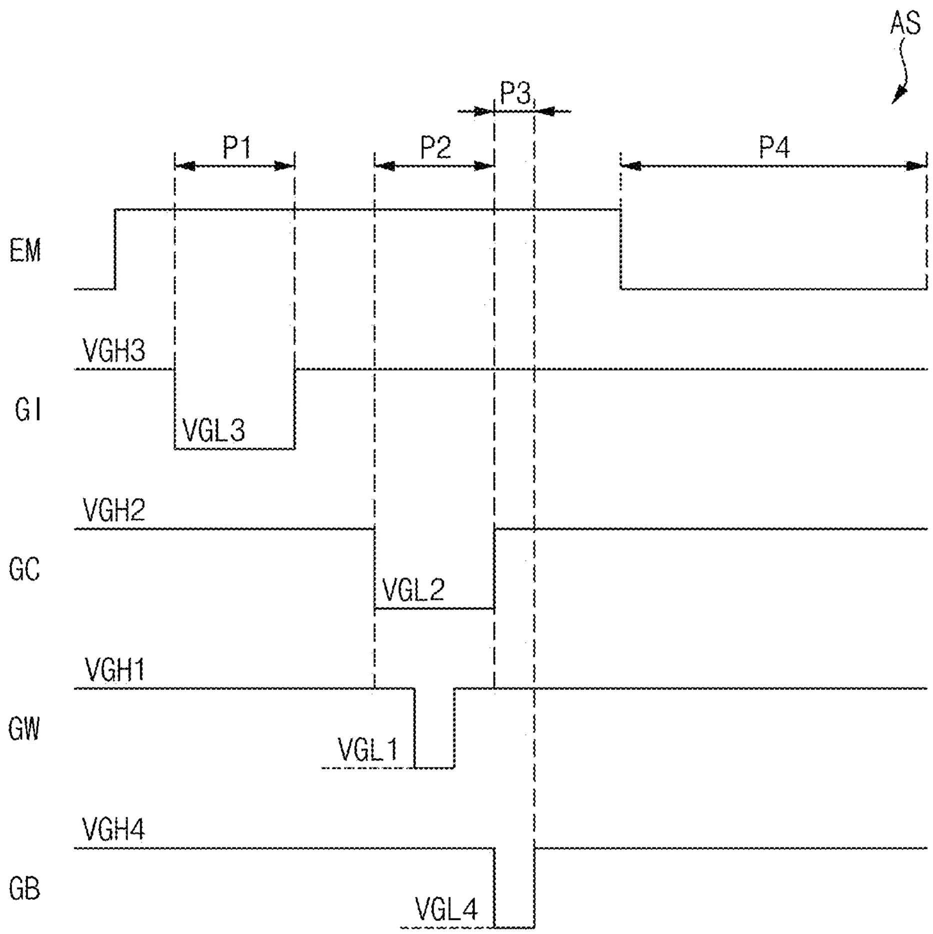
FIG. 8 is a timing diagram showing an emission signal and gate signals provided to the pixel of FIG. 7 in the address scan period.
Figure 9:
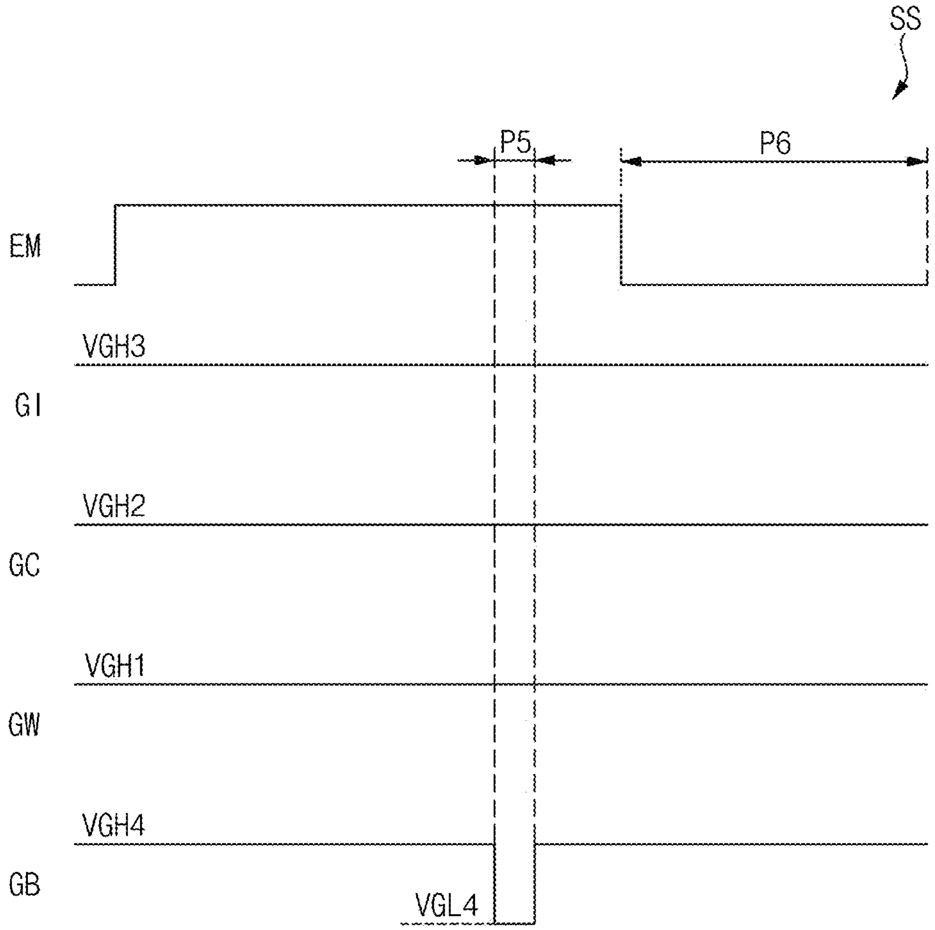
FIG. 9 is a timing diagram showing the emission signal and the gate signals provided to the pixel of FIG. 7 in the self-scan period.
Figure 10:
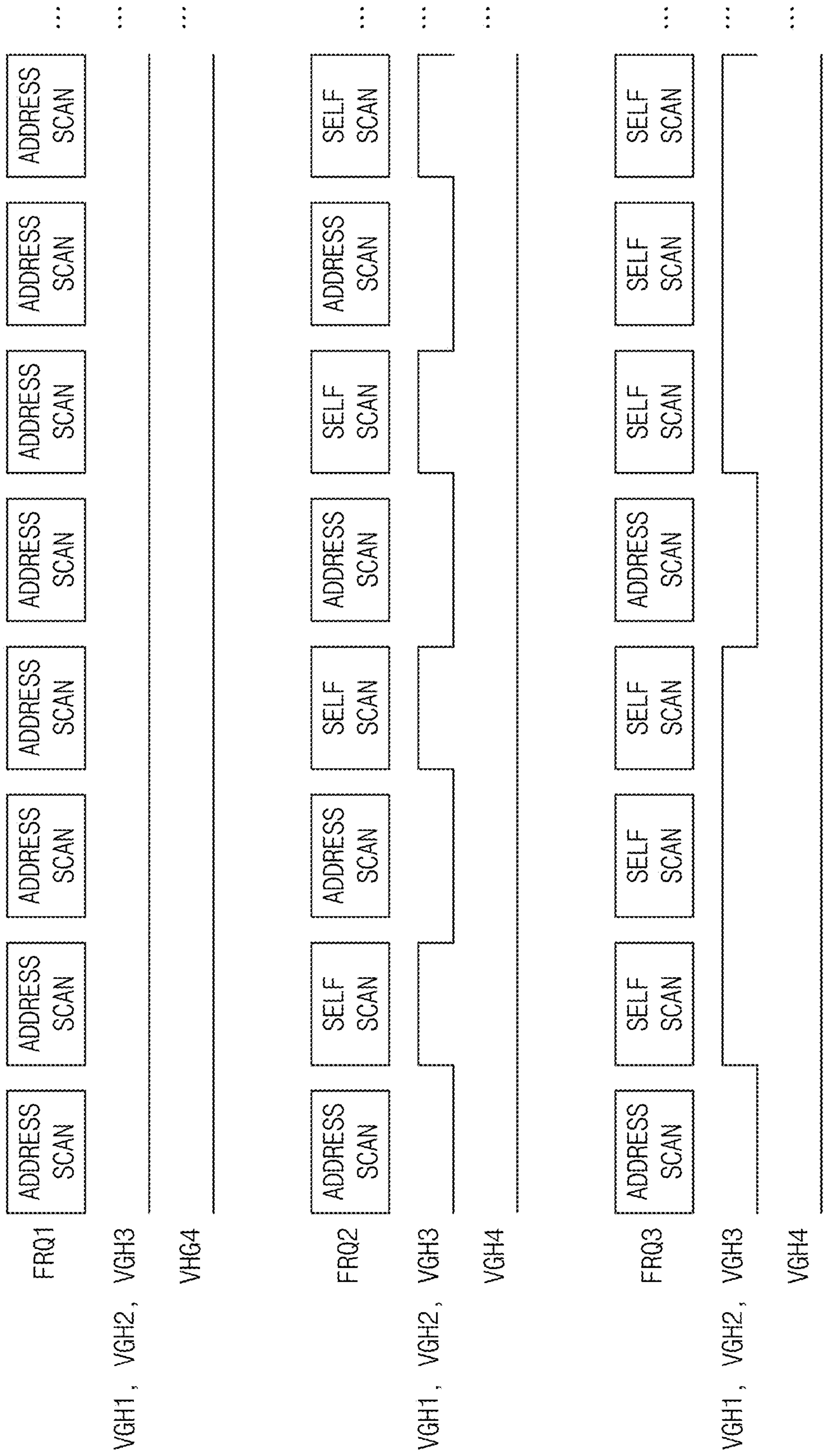
FIG. 10 is a timing diagram showing high gate voltages of the gate signals provided to the pixel of FIG. 7 for each driving frequency.

FIG. 7 is a circuit diagram showing an example of the pixel PX in FIG. 1. FIG. 8 is a timing diagram showing the emission signal EM and the gate signals GI, GC, GW, and GB provided to the pixel PX2 of FIG. 7 in the address scan period AS. FIG. 9 is a timing diagram showing the emission signal EM and the gate signals GI, GC, GW, and GB provided to the pixel PX2 of FIG. 7 in the self-scan period SS. FIG. 10 is a timing diagram showing the high gate voltages VGH1, VGH2, VGH3, and VGH4 of the gate signals GI, GC, GW, and GB provided to the pixel PX2 of FIG. 7 for each driving frequency.

Referring to FIGS. 1, 2, and 7 to 10, the pixel PX2 may include a light-emitting element LED, a first transistor T1, a second transistor T2, a third transistor T3, a fourth transistor T4, a fifth transistor T5, a sixth transistor T6, a seventh transistor T7, an eighth transistor T8, and a storage capacitor CST.

Descriptions of components of the pixel PX2 described with reference to FIGS. 1, 2, and 7 to 10, which are substantially the same as or similar to those of the pixel PX1 described with reference to FIGS. 1 to 6, will be omitted.

The high gate voltages VGH may include a first high gate voltage VGH1, a second high gate voltage VGH2, a third high gate voltage VGH3, and a fourth high gate voltage VGH4. In an embodiment, the first high gate voltage VGH1 may be a gate-off voltage of the first gate signal GW, the second high gate voltage VGH2 may be a gate-off voltage of the second gate signal GC, the third high gate voltage VGH3 may be a gate-off voltage of the third gate signal GI, and the fourth high gate voltage VGH4 may be a gate-off voltage of the fourth gate signal GB.

The low gate voltages VGL may include a first low gate voltage VGL1, a second low gate voltage VGL2, a third low gate voltage VGL3, and a fourth low gate voltage VGL4. In an embodiment, the first low gate voltage VGL1 may be a gate-on voltage of the first gate signal GW, the second low gate voltage VGL2 may be a gate-on voltage of the second gate signal GC, the third low gate voltage VGL3 may be a gate-on voltage of the third gate signal GI, and the fourth low gate voltage VGL4 may be a gate-on voltage of the fourth gate signal GB.

The light-emitting element LED may emit light with a luminance corresponding to the driving current. The light-emitting element LED may include a first electrode (e.g., an anode) connected to the fourth node N4 and a second electrode (e.g., a cathode) receiving the second power voltage ELVSS.

In an embodiment, each of the first transistor T1, the second transistor T2, the third transistor T3, the fourth transistor T4, the fifth transistor T5, the sixth transistor T6, the seventh transistor T7, and the eighth transistor T8 may be the P-type transistor. In an embodiment, each of the first transistor T1, the second transistor T2, the third transistor T3, the fourth transistor T4, the fifth transistor T5, the sixth transistor T6, the seventh transistor T7, and the eighth transistor T8 may be the low-temperature polycrystalline silicon transistor.

In the first period P1 of the address scan period AS, the fourth transistor T4 may be turned on in response to the third low gate voltage VGL3 of the third gate signal GI, and the first initialization voltage VINT may be applied to the gate of the first transistor T1. Accordingly, a channel of the first transistor T1 may be formed before the data voltage VDAT is applied to the gate of the first transistor T1.

In the second period P2 of the address scan period AS, the third transistor T3 may be turned on in response to the second low gate voltage VGL2 of the second gate signal GC, and the first transistor T1 may be diode-connected. Further, the second transistor T2 may be turned on in response to the first low gate voltage VGL1 of the first gate signal GW, and the data voltage VDAT may be transmitted to the first electrode of the first transistor T1. Accordingly, the data voltage VDAT, which is compensated for the threshold voltage of the first transistor T1, be applied to the gate of the first transistor T1, and the storage capacitor CST may store the data voltage VDAT compensated for the threshold voltage of the first transistor T1.

A leakage current may occur in the third transistor T3 when the third transistor T3, which is the low-temperature polycrystalline silicon transistor, is turned off, and a leakage current may occur in the fourth transistor T4 when the fourth transistor T4, which is the low-temperature polycrystalline silicon transistor, is turned off. Specifically, as the temperature of the display panel 110 goes higher or the driving frequency of the display panel 110 becomes lower, the leakage current of each of the third and fourth transistors T3 and T4 may increase. When the temperature of the display panel 110 is high or the driving frequency of the display panel 110 is low, the threshold voltage of each of the third and fourth transistors T3 and T4 may shift positively, and accordingly, the leakage current of each of the third and fourth transistors T3 and T4 may increase. When the leakage current of each of the third and fourth transistors T3 and T4 increases, display defects such as flicker or the like may occur in the image displayed by the display panel 110.

In an embodiment, a level of the second high gate voltage VGH2 in the self-scan period SS may be different from a level of the second high gate voltage VGH2 in the address scan period AS. For example, the level of the second high gate voltage VGH2 in the self-scan period SS may be higher than the level of the second high gate voltage VGH2 in the address scan period AS. As the level of the second high gate voltage VGH2 increases in the self-scan period SS, the level of the gate-off voltage of the third transistor T3 may increase in the self-scan period SS. Thus, the leakage current of the third transistor T3 may decrease in the self-scan period SS. Accordingly, even if the driving frequency of the display panel 110 decreases (even if the number of self-scan periods SS included in the frame period FRM increases), the leakage current of the third transistor T3 may not increase, and the display quality of the image displayed by the display panel 110 may be improved.

In an embodiment, a level of the third high gate voltage VGH3 in the self-scan period SS may be different from a level of the third high gate voltage VGH3 in the address scan period AS. For example, the level of the third high gate voltage VGH3 in the self-scan period SS may be higher than the level of the third high gate voltage VGH3 in the address scan period AS. As the level of the third high gate voltage VGH3 increases in the self-scan period SS, the level of the gate-off voltage of the fourth transistor T4 may increase in the self-scan period SS. Thus, the leakage current of the fourth transistor T4 may decrease in the self-scan period SS. Accordingly, even if the driving frequency of the display panel 110 decreases (even if the number of self-scan periods SS included in the frame period FRM increases), the leakage current of the fourth transistor T4 may not increase, and the display quality of the image displayed by the display panel 110 may be improved. In an embodiment, a level of the fourth high gate voltage VGH4 in the self-scan period SS may be equal to a level of the fourth high gate voltage VGH4 in the address scan period AS.

Figure 11:
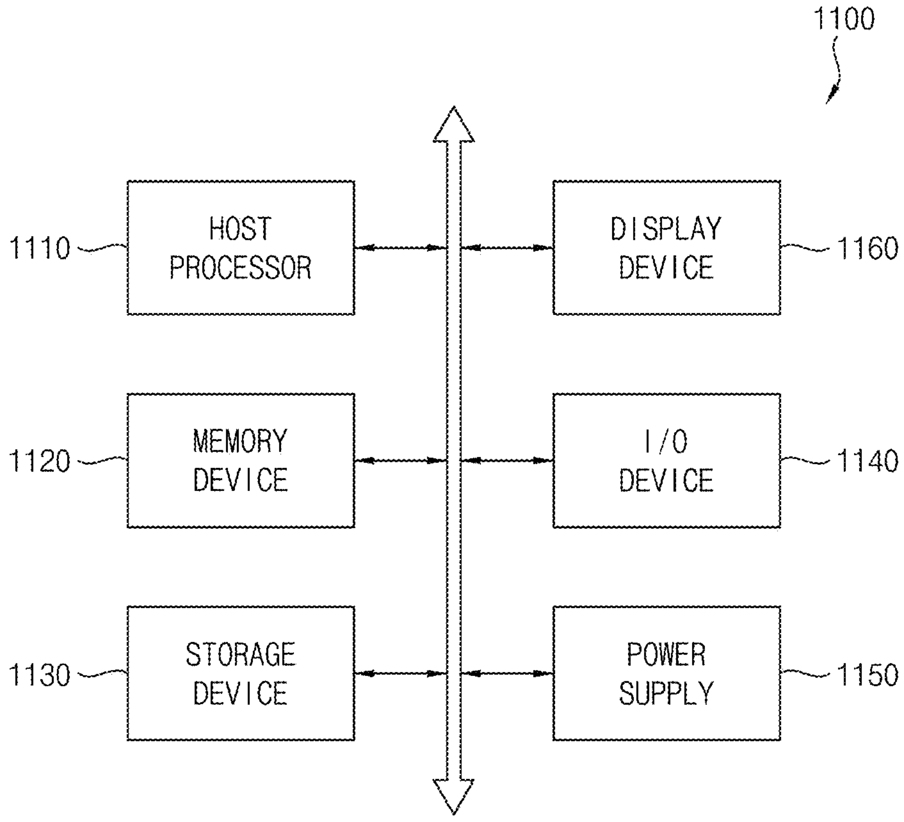
FIG. 11 is a block diagram showing an electronic apparatus according to an embodiment.

FIG. 11 is a block diagram showing an electronic apparatus 1100 according to an embodiment.

Referring to FIG. 11, an electronic apparatus 1100 may include a host processor 1110, a memory device 1120, a storage device 1130, an input/output ("I/O") device 1140, a power supply 1150, and a display device 1160. The electronic apparatus 1100 may further include a plurality of ports capable of communicating with a video card, a sound card, a memory card, a USB device, and the like, or communicating with other systems.

The host processor 1110 may perform specific calculations or tasks. In an embodiment, the host processor 1110 may be a microprocessor, a central processing unit ("CPU"), or the like. The host processor 1110 may be connected to other components through an address bus, a control bus, a data bus, and the like. In an embodiment, the host processor 1110 may also be connected to an expansion bus such as a peripheral component interconnect (PCI) bus. In an embodiment, the host processor 1110 may provide the first image data (IMD1 of FIG. 1) and the controller control signal (CNT0 of FIG. 1) to the display device 1160.

The memory device 1120 may store data required for an operation of the electronic apparatus 1100. For example, the memory device 1120 may include a nonvolatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM) and/or a volatile memory device such as a dynamic random access memory (DRAM), a static random access memory (SRAM), or a mobile DRAM.

The storage device 1130 may include a solid state drive (SSD), a hard disk drive (HDD), a CD-ROM, and the like. The I/O device 1140 may include an input device such as a keyboard, a keypad, a touch pad, a touch screen, or a mouse, and an output device such as a speaker or a printer. The power supply 1150 may supply a power required for the operation of the electronic apparatus 1100. The display device 1160 may be connected to other components through the buses or other communication links. The display device 1160 may correspond to the display device 100 of FIG. 1.

In a pixel included in the display device 1160, as a level of a high gate voltage, which is a gate-off voltage of a gate signal, in a self-scan period may be different from a level of the high gate voltage in an address scan period, a leakage current of a transistor that is turned off in response to the gate signal may decrease. Further, as the display device 1160 may include a pixel in which the leakage current of the transistor is reduced, display defects such as vertical crosstalk, flicker, or the like of the display device 1160 may decrease, leading to an improvement in the display quality of the display device 1160.

The display device according to the embodiments may be applied to a display device included in a computer, a notebook, a mobile phone, a smart phone, a smart pad, a smart watch, a PMP, a PDA, an MP3 player, or the like.

Although the display device and the pixel according to the embodiments have been described with reference to the drawings, the embodiments shown above are examples, and may be modified and changed by a person having ordinary knowledge in the relevant technical field without departing from the technical spirit described in the following claims.

What is claimed is:

1. A display device, comprising:

a display panel including a pixel;

a gate driver which provides a plurality of gate signals to the pixel;

a data driver which provides a data voltage to the pixel in an address scan period and does not provide the data voltage to the pixel in a self-scan period; and a power management circuit which provides high gate voltages of the gate signals to the gate driver, wherein a level of a high gate voltage which is one of the high gate voltages in the self-scan period is different from a level of the high gate voltage in the address scan period, and wherein the address scan period is a period where the data voltage is written in the pixel and the pixel emits light corresponding to the written data voltage, and the self-scan period is a period where the pixel emits light corresponding to the data voltage written in the pixel in the address scan period.

2. The display device of claim 1, wherein the level of the high gate voltage in the self-scan period is higher than the level of the high gate voltage in the address scan period.

3. The display device of claim 1, wherein the pixel includes:

a light-emitting element;

a first transistor which controls a driving current which flows through the light-emitting element;

a second transistor which provides the data voltage to a gate of the first transistor in response to a first gate signal; and a storage capacitor which stores a voltage of the gate of the first transistor, and wherein a level of a first high gate voltage which is a gate-off voltage of the first gate signal in the self-scan period is different from a level of the first high gate voltage in the address scan period.

4. The display device of claim 3, wherein the level of the first high gate voltage in the self-scan period is higher than the level of the first high gate voltage in the address scan period.

5. The display device of claim 3, wherein the pixel further includes:

a third transistor which compensates for a threshold voltage of the first transistor in response to a second gate signal, and wherein a level of a second high gate voltage which is a gate-off voltage of the second gate signal in the self-scan period is different from a level of the second high gate voltage in the address scan period.

6. The display device of claim 5, wherein the level of the second high gate voltage in the self-scan period is higher than the level of the second high gate voltage in the address scan period.

7. The display device of claim 5, wherein the pixel further includes:

a fourth transistor which provides a first initialization voltage to the gate of the first transistor in response to a third gate signal, and wherein a level of a third high gate voltage which is a gate-off voltage of the third gate signal in the self-scan period is different from a level of the third high gate voltage in the address scan period.

8. The display device of claim 7, wherein the level of the third high gate voltage in the self-scan period is higher than the level of the third high gate voltage in the address scan period.

9. The display device of claim 7, wherein each of the third transistor and the fourth transistor is a low-temperature polycrystalline silicon transistor.

10. The display device of claim 7, wherein the pixel further includes:

a fifth transistor which blocks a connection between a first electrode of the first transistor and a first power voltage in response to an emission signal;

a sixth transistor which blocks a connection between a second electrode of the first transistor and a second power voltage in response to the emission signal; and a seventh transistor which provides a second initialization voltage to a first electrode of the light-emitting element in response to a fourth gate signal, wherein a level of a fourth high gate voltage which is a gate-off voltage of the fourth gate signal in the self-scan period is equal to a level of the fourth high gate voltage in the address scan period.

11. The display device of claim 10, wherein the pixel further includes:

an eighth transistor which provides a bias voltage to the first electrode of the first transistor in response to the fourth gate signal.

12. The display device of claim 1, wherein a frame period includes the address scan period and a plurality of self-scan periods including the self-scan period, and wherein a length of the self-scan period is equal to a length of the address scan period.

13. The display device of claim 12, wherein a number of the self-scan periods included in the frame period increases as a driving frequency of the display panel decreases.

14. A pixel, comprising:

a light-emitting element;

a first transistor which controls a driving current which flows through the light-emitting element;

a second transistor which provides a data voltage to a gate of the first transistor in response to a first gate signal; and a storage capacitor which stores a voltage of the gate of the first transistor, wherein a level of a first high gate voltage which is a gate-off voltage of the first gate signal in a self-scan period is different from a level of the first high gate voltage in an address scan period, and wherein the address scan period is a period where the data voltage is written in the pixel and the pixel emits light corresponding to the written data voltage, and the self-scan period is a period where the pixel emits light corresponding to the data voltage written in the pixel in the address scan period.

15. The pixel of claim 14, wherein the level of the first high gate voltage in the self-scan period is higher than the level of the first high gate voltage in the address scan period.

16. The pixel of claim 14, further comprising:

a third transistor which compensates for a threshold voltage of the first transistor in response to a second gate signal, and wherein a level of a second high gate voltage which is a gate-off voltage of the second gate signal in the self-scan period is different from a level of the second high gate voltage in the address scan period.

17. The pixel of claim 16, wherein the level of the second high gate voltage in the self-scan period is higher than the level of the second high gate voltage in the address scan period.

18. The pixel of claim 16, further comprising:

a fourth transistor which provides a first initialization voltage to the gate of the first transistor in response to a third gate signal, and wherein a level of a third high gate voltage which is a gate-off voltage of the third gate signal in the self-scan period is different from a level of the third high gate voltage in the address scan period.

19. The pixel of claim 18, wherein the level of the third high gate voltage in the self-scan period is higher than the level of the third high gate voltage in the address scan period.

20. The pixel of claim 18, wherein each of the third transistor and the fourth transistor is a low-temperature polycrystalline silicon transistor.

* * * * *